United States Patent [19]

Horner

[11] Patent Number: 4,588,260

[45] Date of Patent: May 13, 1986

[54] PHASE-ONLY OPTICAL FILTER FOR USE IN AN OPTICAL CORRELATION SYSTEM

[75] Inventor: Joseph L. Horner, Cambridge, Mass.

[73] Assignee: The United States of America as represented by the Secretary of the Air Force, Washington, D.C.

[21] Appl. No.: 596,471

[22] Filed: Apr. 3, 1984

[51] Int. Cl.⁴ .................... G02B 27/46; G03H 1/16; G06G 9/00

[52] U.S. Cl. .................. 350/162.13; 364/822; 350/3.82

[58] Field of Search ............ 350/162.12, 162.13, 350/162.14, 3.66, 3.67, 3.68, 3.81, 3.82, 320; 364/822

[56] References Cited

U.S. PATENT DOCUMENTS

| | | | |
|---|---|---|---|
| 3,435,244 | 3/1969 | Burckhardt et al. | 350/3.83 |
| 3,543,237 | 11/1970 | Cutler et al. | 350/162.12 |
| 3,572,878 | 3/1971 | Lu | 350/3.66 |
| 3,580,655 | 5/1971 | Leith | 350/3.6 |
| 4,059,343 | 11/1977 | Kowalski et al. | 350/162.13 |

OTHER PUBLICATIONS

Vander Lugt, "Signal Detection by Complex Spatial Filtering," *IEEE Transactions on Information Theory*, vol. IT-10, No. 2, Apr. 1964, pp. 139-145.

Horner, Joseph L., "Light Utilization in Optical Correlators," *Applied Optics*, vol. 21, No. 24, Dec. 15 1982, pp. 4511-4514.

Oppenheim and Lim, "The Importance of Phase in Signals," *Proceedings of the IEEE*, vol. 69, No. 5, May 1981, pp. 529-541.

*Primary Examiner*—John K. Corbin
*Assistant Examiner*—B. S. Shapiro
*Attorney, Agent, or Firm*—Donald J. Singer; Jacob N. Erlich

[57] ABSTRACT

A phase-only optical filter capable of being utilized within a phase-only optical correlation system. The phase-only optical filter is made by mathematically generating preselected phase-only information by a fast Fourier Transform technique. This generated phase-only information is transferred onto an unexposed holographic film. Thereafter, the film is developed and subsequently bleached. The resultant bleached film is the phase-only filter which, when utilized in a correlation system, provides substantially 100% utilization of the source of electromagnetic radiation during the correlation process.

10 Claims, 13 Drawing Figures

PHASE-ONLY OPTICAL FILTER FOR USE IN AN OPTICAL CORRELATION SYSTEM

STATEMENT OF GOVERNMENT INTEREST

The invention described herein may be manufactured and used by or for the Government for governmental purposes without the payment of any royalty thereon.

BACKGROUND OF THE INVENTION

This invention relates generally to optical correlators, and, more particularly, to a phase-only optical correlation filter for use within an optical correlation system.

In recent years, the acceptance of optical correlation systems has greatly expanded because of their extreme usefulness in the processing of optical signals in, for example, the analysis of radar information or sonar information. More specifically, the optical correlation can effectively compare a pair of optical signals and by an analysis of intensity peaks determine information with respect to the optical signals. The Vander Lugt optical correlator, in particular, has proven to be an effective and valuable addition to the collection of optical processing systems. The Vander Lugt optical correlator has found applicability in such diverse applications as classifying diatoms and inspecting welding seams. It is an extremely powerful optical instrument because it can search an input beam for a desired pattern without any mechanical motion and provide a simple way to fabricate a matched filter. An excellent description of such a Vander Lugt optical correlator can be found in a paper published by A. Vander Lugt entitled "Signal Detection by Complex Spatial Filtering," *IEEE Transactions on Information Theory*, Volume IT-10, No. 2, April 1964, pages 139 through 145.

In a practical working optical correlation system it is desirable that the overall utilization of the laser light source be as efficient as possible. It is possible to measure the utilization of the laser light source by the ratio of light energy in the correlation spot in the output plane to the light energy at the input plane as discussed in greater detail by this inventor in an article entitled "Light Utilization in Optical Correlators," *Applied Optics*, Vol. 21, No. 24, 15 December 1982, pgs. 4511–4514. A high throughput of light is desireable in a practical working system in order to keep the laser power requirements as small as possible in order for such a correlation system to be usable in, for example, a portable or airborne system, and to achieve a high detector signal-to-scattered light (noise) ratio.

In the past, such as with the above-mentioned Vander Lugt optical correlator, the filter was formed holographically on a photosensitive plate such as, for example, a black and white holographic film such as #649F. The light throughput of the system is determined by the optical efficiency of the filter. Unfortunately, as pointed out by this inventor in the above-mentioned article entitled "Light Utilization in Optical Correlators," the efficiency of the matched filter utilized with the Vander Lugt correlator, even if made on a perfect medium, would only produce an efficiency of 44.4% for a simple rectangular function input. In a number of applications, where the use of a high power laser source is acceptable, such relatively low efficiency is permissible. However, in many of todays portable or airborn systems, in which a laser diode of low power is generally utilized as the light energy source, the efficiency of the matched filter becomes critical and therefore substantially limits the utilization of past optical correlators such as the above-mentioned Vander Lugt correlator.

In recent studies as set forth, for example, by Oppenheim and Lim, in an article entitled "The Importance of Phase in Signals," *Proceedings of the IEEE*, Volume 69, No. 5, May 1981, pages 529 through 541, it was found that phase information is considerably more important than amplitude information in preserving the visual intelligibility of a picture. Even more interesting, was the fact that when the phase information of one picture was combined with the amplitude information from an ensemble average of a group of pictures, the reconstructed picture was almost identical to the original picture. Similiar observations can be made about the Kinoform, which is a phase-only hologram, and reconstruction of atomic structure from x-ray diffraction data. Fourier synthesis of the structure from only the amplitude of the diffraction with zero phase does not reconstruct the correct structure, where as reconstruction from the phase data and unity amplitude does. Consequently, this inventor has determined that a phase-only filter incorporated within an optical correlation system could provide excellent correlation with a minimum of input power. Unfortunately, to date, producing a reliable phase-only filter for use within an optical correlation system has been unobtainable.

SUMMARY OF THE INVENTION

The present invention overcomes past problems associated with optical correlation systems by providing a method of producing a phase-only optical filter for use within a phase-only optical correlation system.

In order to substantially increase the efficiency of optical correlators, the present invention utilizes a series of photo-chemical techniques to produce a phase-only optical correlation filter. More specifically, the production of such a phase-only optical filter incorporates therein the following novel method. Initially, the desired phase-only information is calculated mathematically. Once the phase-only information is obtained any suitable conventional optical writer may be utilized to transfer or "optically write" this phase information onto an unexposed holographic film. Thereafter the film is developed and subsequently bleached. Once bleached the film is available as a phase-only optical filter for utilization within a optical correlation system.

Upon placement of the phase-only optical filter in the optical correlation system (i.e. a modified Vander Lugt correlator) it is possible to provide an on-axis correlation between two signals (i.e. objects) with an extremely low power electromagnetic radiation source. In other words, the use of a phase-only optical correlation filter made by the process of this invention permits substantially 100% utilization of the electromagnetic beam of radiation during the correlation operation.

It is therefore an object of this invention to provide a method of producing a phase-only optical correlation filter.

It is another object of this invention to provide a phase-only optical correlation system.

It is a further object of this invention to provide a phase-only optical correlation filter which has substantially 100% optical efficiency.

It is an even further object of this invention to provide a phase-only optical correlation system which is capable of providing an extremely high degree of discrimination between signals.

It is still another object of this invention to provide a phase-only filter and phase-only optical correlation system which is economical to produce and which utilizes conventional, currently available components in the manufacture thereof.

For a better understanding of the present invention, together with other and further objects thereof, reference made to the following description, taken in conjunction with the accompaning drawings and its scope will be pointed out in the appended claims.

DETAILED DESCRIPTION OF THE PREFERRED EMBODIMENT

In order to more clearly understand the concepts involved in the production of the phase-only correlation filter of the present invention and its use within a phase-only optical correlation system it is first necessary to understand the basic idea of correlation. In general, correlation (that is, the comparison of a pair of functions) can be implemented either optically in an optical system such as the above-mentioned Vander Lugt optical correlator or digitally on a digital computer. Even more basically, correlation involves the sliding of one function across the other function and adding up the common areas. Stated more succinctly, correlation is a measure of just how alike two functions are. Mathematically, correlation is defined by the following equation (1):

$$C_{(\tau)} = \int_{-\infty}^{\infty} f(x) \cdot g(x - \tau) dx \tag{1}$$

where $C_{(\tau)}$ = the correlation function;
f(x) = one input function; and
$g(x-\tau)$ = another function, displaced by an amount $\tau$.

Figure 1:
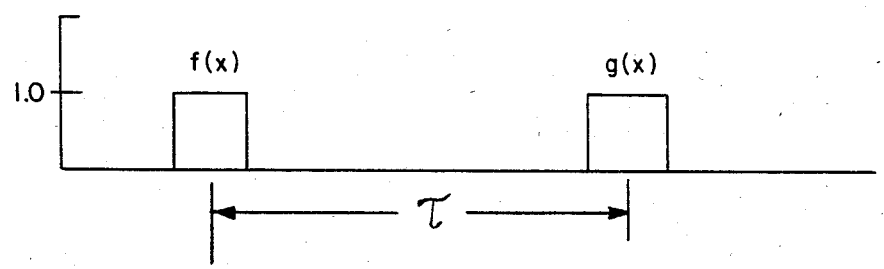
FIG. 1 is a graphic representation of the functions f(x) and g(x) displaced by a distance $\tau$ during correlation.
Figure 2:
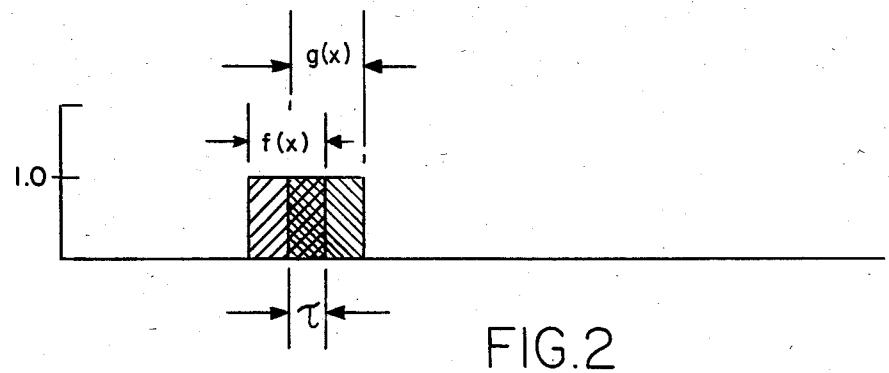
FIG. 2 is a graphic representation of the functions f(x) and g(x) beginning to overlap each other during correlation.

Illustrated graphically, and as shown in FIG. 1 of the drawings each of the functions f(x) and g(x) have a height of, for example, 1.0 and are displaced from one another by a distance $\tau$. If these functions f(x) and g(x) are multiplied together in accordance with equation (1) then the product everywhere is zero. As the functions begin to overlap as shown in FIG. 2 of the drawings, there will be a contribution to the correlation integral of equation (1).

Figure 3:
FIG. 3 is a graphic representation of the correlation of the functions f(x) and g(x)

FIG. 3 illustrates graphically the correlation of the two rectangle functions f(x) and g(x). The peak height of the correlation function, occurring at $\tau=0$, is equal to the area under the functions.

Another method of producing the results set forth by the correlation calculation of equation (1) is to operate in the Fourier Transform domain. Equation (2) set forth below mathematically illustrates this relationship, sometimes referred to as the Wiener-Kinchine theorem.

$$C_{(\tau)} = \mathscr{F}^{-1}(F(\omega) \cdot G^*(\omega)) \tag{2}$$

where $C_{(\tau)}$ = the correlation function;
$F(\omega)$ = the Fourier Transform of one of the functions;
$G(\omega)$ = the Fourier Transform of the other function;
* = the complex conjugation operators; and
$\mathscr{F}^{-1}$ = the inverse Fourier Transform operator.

In other words, as set forth in equation (2), it is readily understandable that the correlation of the two functions are given by the inverse Fourier Transform of the product of the spectrums i.e. Fourier Transforms, of the two functions, where the Fourier Transform of a function is defined by the following equation (3).

$$F(\omega) = \mathscr{F}(f(x)) = \int_{-\infty}^{\infty} f(x)e^{i\phi(x)}dx \tag{3}$$

Stated more succinctly, the Vander Lugt optical correlator makes use of the so-called Wiener Khinchine theorem to perform its correlation as set forth in equation (2).

Figure 4:
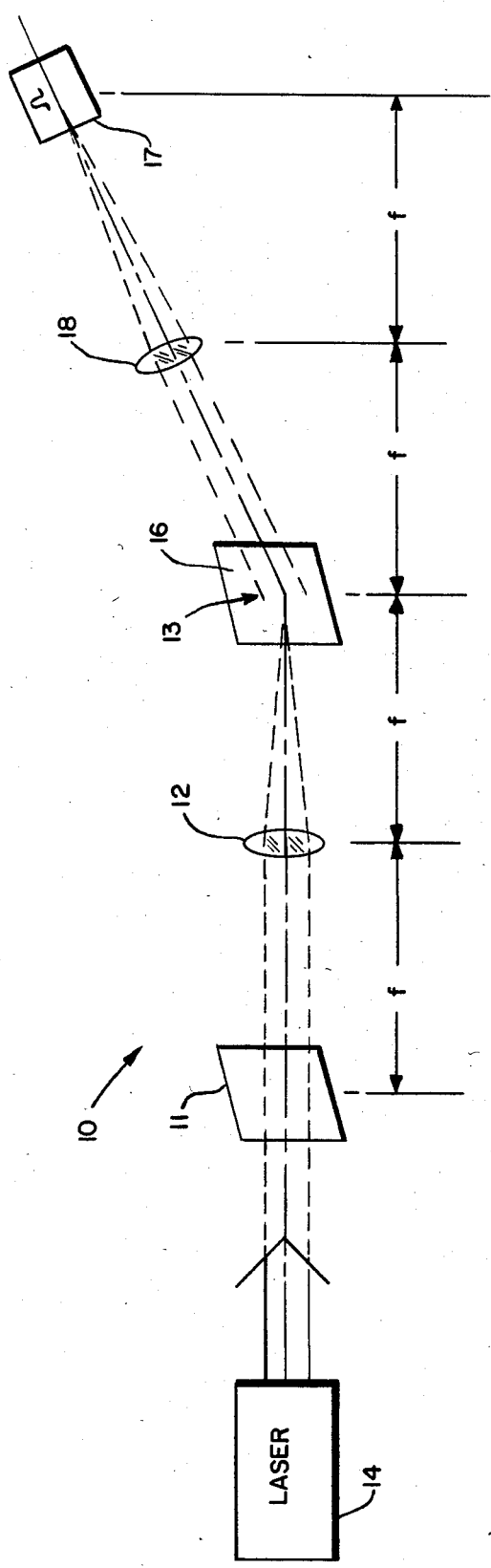
FIG. 4 is a schematic illustration of the basic components of the Vander Lugt optical correlator.

An optical correlation of the functions f(x) and g(x) can be performed by means of the conventional Vander Lugt correlator of the type described in the above-cited article in *IEEE Transactions on Information Theory*. In the Vander Lugt correlator 10 as shown in FIG. 4 of the drawings the function f(x) is "written" on a film 11 which is located one focal length, f, in front of a Fourier Transform lens 12. One focal length, f, on the other side of lens 12 is the focal plane or, as mathematically expressed, the Fourier Transform plane. It is in this plane 13 that an almost exact representation of the Fourier Transform of signal f(x) appears. Such a signal appears "written" on the light (electromagnetic beam) from a laser source 14 utilized in the conventional Vander Lugt correlator. As pointed out above in the Vander Lugt optical correlator this laser source 14 must be in the form of a high power laser. The resultant signal is a complex signal where the amplitude of the light corresponds to the amplitude of the transform and the phase of the light, in essence, corresponds to the phase of the Fourier Transform. The Vander Lugt correlator 10 holographically encodes such a complex signal on a medium 16 such as a holographic film that only responds to intensity. Such a procedure (as briefly described above) is conventional and capable of producing a conventional and well recognized matched or classical matched filter. Correlation between functions of signals f(x) and g(x) which is formed in the plane 17 one focal length, f, away from inverse Fourier Transform lens 18, is obtained as a result of the inverse Fourier Transform of the product of the signal $F(\omega)$ and the signal $G(\omega)$.

There are three major problems associated with the classical matched filter of the type described above and made by the Vander Lugt correlation technique. The first problem is a scale variance problem while the second problem is a rotation variance problem. Scale and rotation variance problems come about as a result of the basic definition of correlation, see equation (1) and equation (2) above. If the object changes scale, a different size results and the correlation peak diminishes. The above problems place a severe practical limitations on the use of past optical correlators for target identification. The same is true of rotation, since the object will then appear to the optical system at a different angle or a different aspect such that the filter may be incapable of recognizing it.

Past solutions to this problem involve taking different sizes of the same object and different angular aspects of the same object and combining them on a single filter. Unfortunately, while this solution may solve the problem of variation of scale and rotation, it leads to a very low utilization of the input light source, that is, the third and most important problem associated with the matched filter. In other words, most of the input light source energy is dissipated in the filter itself. Consequently, one must use an extremely powerful laser source in order to have sufficient light available for correlation plane detection. Such a problem is clearly addressed by this inventor in his article referred to hereinabove entitled "Light Utilization in Optical Correlators" and discussed under the Background of the Invention. If it were possible to develop a filter receptive to phase alone, adequate discrimination between characters would be possible in conjunction with the long sought after high optical efficiency. This concept is described in greater detail hereinbelow as well as at the 10th International Optical Computing Conference, Apr. 6-8, 1983 at MIT, Cambridge, MA by the inventor and in an article entitled "Phase-only Matched Filter," *Applied Optics*, Vol. 23, No. 6, Mar. 15, 1984, pgs 812-816, which is incorporated herein be reference.

The present invention is primarily directed to the production of just such a filter, referred to by the inventor as a phase-only correlation filter. One method of producing such a phase-only correlation filter would be to construct such a filter by means of a computer generated hologram. The exact procedures for making such a hologram are discussed by Lohmann and Paris in an article entitled "Binary Fraunhofer Holograms Generated by Computer," *Applied Optics Journal*, Vol 6, No. 10, October 1967, pp 1739-1748. In this procedure a computer would calculate a desired optical interference pattern and then have this pattern "written out" by a conventional pen-and-ink plotter under the control of the computer. Such a "write out" would then be photoreduced in size onto a holographic film. Consequently, the "write out" would still have substantially the same characteristics as a hologram. Although the advantage to this approach would be that the physical object would not have to exist, the disadvantage associated with such a computer generated filter (hologram) would be the extremely low optical efficiency and the introduction of spurious light components associated therewith. Unfortunately, there appears to be no effective method for transferring such a low efficiency computer constructed hologram into a high efficiency hologram.

The preferred embodiment of the present invention involves the utilization of several photo-chemical techniques in order to produce the phase-only correlation filter of this invention. Utilization of such techniques result in a direct phase modulation of a film thereby completely overcomming the problems associated with the past off-axis technique of Vander Lugt and its associated problem of optical efficiency.

In order to produce a phase-only correlation filter by the method of the present invention it is first necessary to calculate in a conventional manner by computer such as the VAX computer manufactured by Digital Equipment Corporation, the desired phase-only information. These calculations (more commonly referred to as the Fast Fourier Transform (FFT)) are set forth by Cooley and Tukey in an article entitled "An Algorithum for the Machine Calculation of Complex Fourier Series," *Mathematics of Computation*, Volume 19, No. 90, April 1965 pp 297-301, and incorporated herein by reference.

In such a procedure, the computer would first Fourier Transform the desired signal according to equation (3) set forth above. The resulting function $F(\omega)$ can be written as set forth in equation (4) below.

$$F(\omega) = A(\omega) e^{i\phi(\omega)} \qquad (4)$$

where $\omega$ is the spatial frequency variable.

The function $A(\omega)$ is referred to as the amplitude portion of the function, and $e^{i\phi(\omega)}$ is the phase-only portion.

Once the phase-only information is obtained, any suitable conventional optical writer under computer control can be utilized to transfer or "optically write" this phase information or function onto an unexposed holographic film. This can be accomplished by means of a conventional Holowriter, such as assembled by the Aerodyne Corp., Billerica, MA, which converts the mathematical phase information (array of numbers) into an intensity modulated beam of electromagnetic energy (light or electron beam). This modulated interaction is thereafter imaged onto an unexposed holographic film. As an alternative, with the present invention, it would be possible to transfer this phase information onto a film by use of a conventional electron-beam machine, or E-beam such as used in semiconductor wafer manufacture for fabricating the necessary masks. In this operation an electron beam is focused electronically onto an electron sensitive film and can be controlled by computer accordingly. An advantage of the E-beam machine over the optical writer is its superior resolution.

Thereafter the film is developed in accordance with the recommendations of the manufacturer of the film, for example Agfa-Gavaert #10E75. After developing the film is bleached. A typical bleaching procedure acceptable with the present invention is described by van Renesse and F. A. J. Bouts in an article entitled "Efficiency of Bleaching Agents for Holography," *OPTIK Journal*, volume 38, No. 2, 1973, pp 156–168, wherein a suitable holographic film such as Agfa-Gavaert #10E75 was exposed to Helium-Neon laser light, 632.8 nm wavelength, and bleached in a mercury chloride solution with the resultant reaction set forth below:

$$Ag + Hg Cl_2 \rightarrow Ag Hg Cl_2 \downarrow \tag{5}$$

The reaction associated therewith is one whereby the metallic silver in the exposed film is converted into a clear, transparent, silver salt whose index of refraction differs from the surrounding gelatin medium, and thereby produces a phase shift in the light traversing the medium. The phase-only function, $e^{i\phi(\omega)}$ of equation (4), must be suitably modified by the nonlinearities of the photographic film, i.e. the well known Hurter-Driffield curves.

Figure 5:
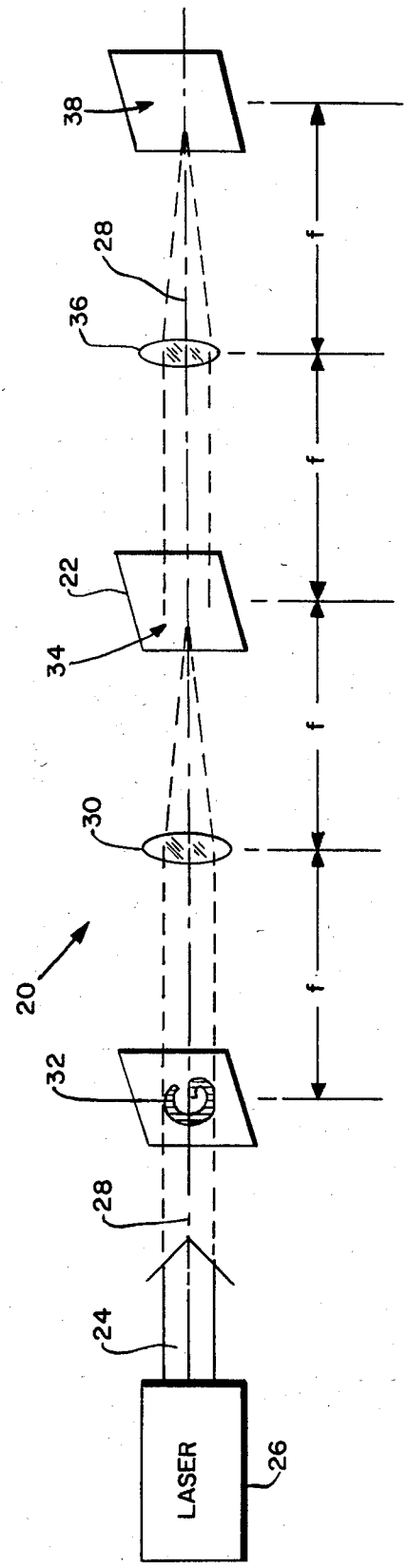
FIG. 5 is a schematic representation of the phase-only correlation filter of the present invention utilized within a phase-only optical correlation system.

Once the film has been bleached it is available as a phase-only correlation filter for utilization within correlation system 20, (i.e. a modified Vander Lugt optical correlator) as shown in FIG. 5 of the drawings. As illustrated in FIG. 5 of the drawings the correlation plane is on-axis contrary to the off-axis relationship of past correlation systems (the Vander Lugt correlator shown in FIG. 4).

Reference is now made to FIG. 5 of the drawings which clearly illustrates, in schematic fashion, the phase-only optical correlator 20 which incorporates therein the phase-only correlation filter 22 made with the method of this invention. Similar to the Vander Lugt optical correlator 10 described hereinabove a beam of electromagnetic radiation (light) 24 is provided by any suitable laser source 26 such as helium-neon laser with a wavelength of 632.8 nm. With correlator 20, however, contrary to past correlators, the laser source is of low power (approximately 10 mW). Light beam 24 is directed by laser 26 along a preselected optical axis 28. Optically aligned with beam 24 and coincidental with the optical axis 28 are the remaining components of phase-only correlator 20.

A Fourier Transform lens 30 is placed in optical alignment with beam 24 along optical axis 28, one focal length, f, after a signal 32 in the form of, for example, a spatial light modulator or film transparency of an object. Lens 30 forms the Fourier Transform of signal 32 (having both amplitude and phase information) at a preselected location 34, i.e. a focal length, f, beyond lens 30. It should be noted that all focal lengths within correlator 20 are equal in length. The phase-only filter 22 is placed at location 34 and provides phase-only information of another signal which is representative of the object to be compared with or correlated with signal 32. Situated one focal length, f, from location 34 is an inverse Fourier Transform lens 36 (i.e. a Fourier Transform lens which is identical to lens 30 except that in operation the coordinates are inverted). Lens 36 takes the inverse Fourier Transform of the product of signal 32 and the phase-only information signal. This inverse Fourier Transform is formed at location 38, one focal length, f, from lens 36, and still coincidental with optical axis 28. The inverse Fourier Transform formed at 38 is substantially equivalent to the mathematical correlation function between signals.

Figure 6B:
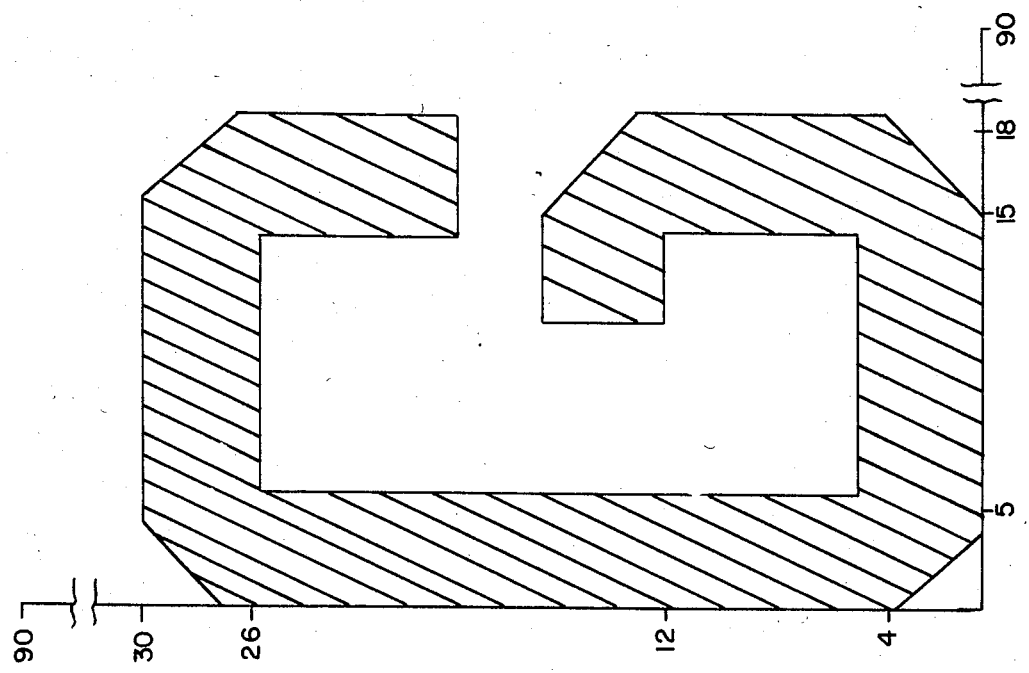
FIGS. 6A and 6B illustrate the letters O and G, respectively, which are utilized to demonstrate the effectiveness of the phase-only optical correlation system of this invention.
Figure 6A:
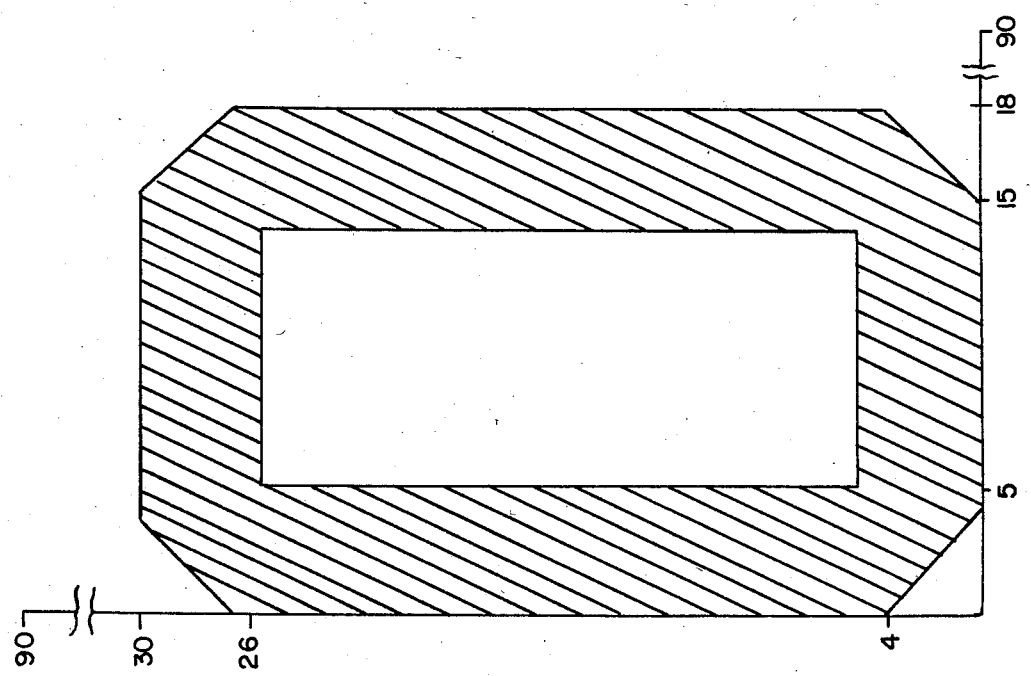

In order to evaluate and substantiate the results produced by the phase-only filter 22 of the present invention, that is, to study the correlation properties of the phase-only correlation filter 22, a computer simulation of the entire process was programmed using a 90×90 point Fast Fourier Transform (FFT). In order to determine the accuracy of phase-only correlation, as a test example, the capital letters O and G as illustrated in FIGS. 6A and 6B of the drawings were used in the description set forth above, that is, signal 32 could be representative of the letter G. Since these letters (O, G) are very similiar, they yield an excellent indication of the discrimination ability of the phase-only correlation filter 22 of the present invention. The evaluation of the phase-only filter 22 of the present invention was performed by computer simulation under conditions of both noise and no noise. In all of the tests the object recorded on the filter was the letter G.

Figure 7:
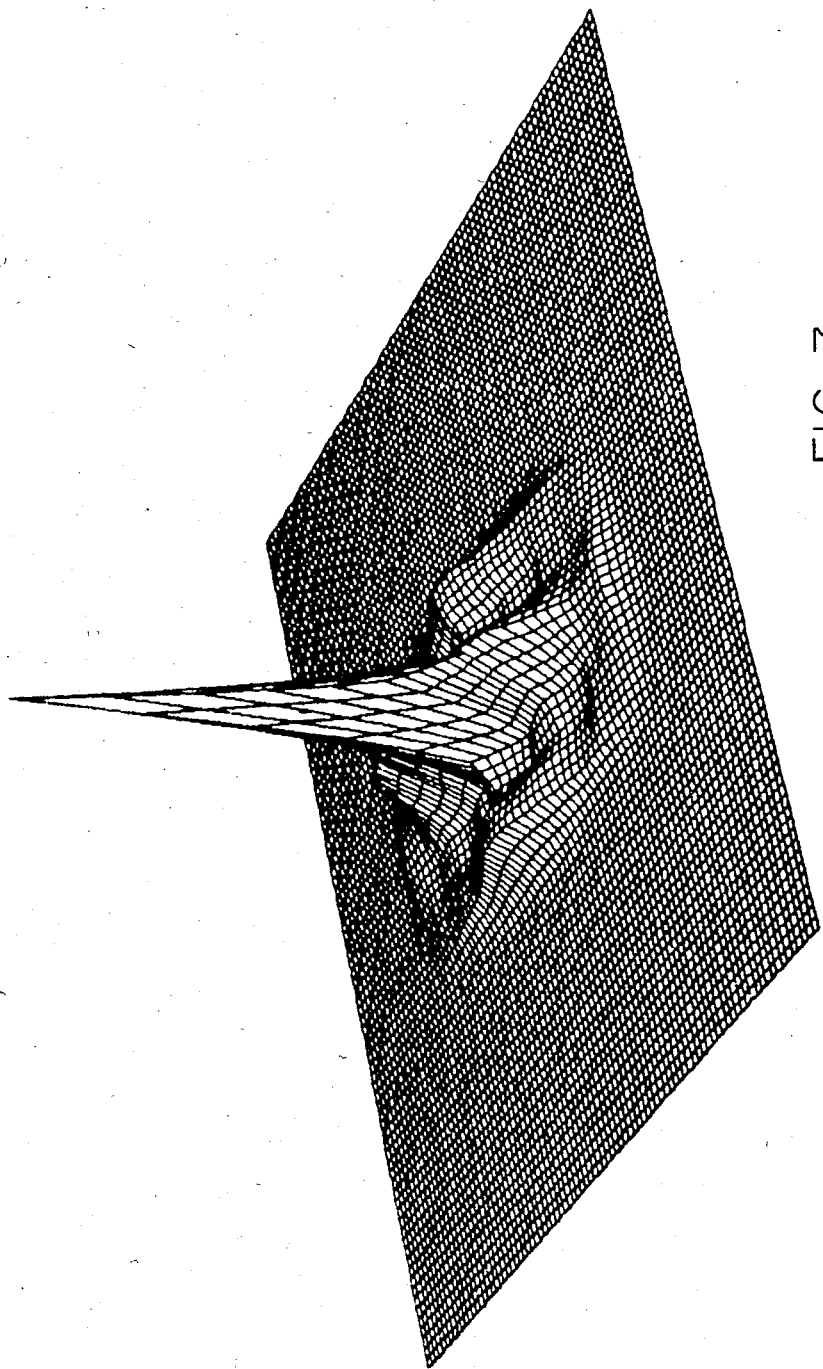
FIG. 7 is a three dimensional graphic representation of the correlation of the letter G utilizing a conventional or classical matched filter under noiseless conditions.
Figure 8:
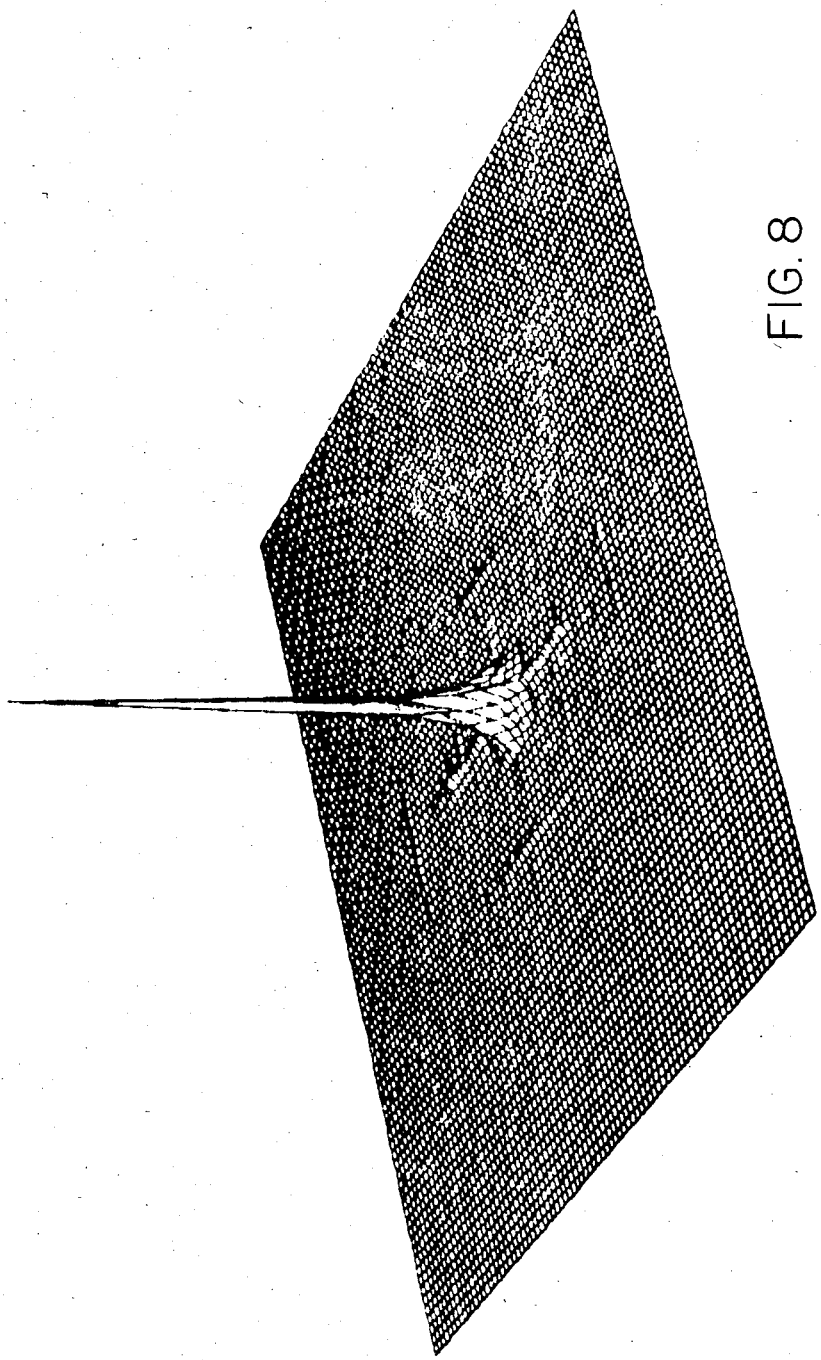
FIG. 8 is a three dimensional graphic representation of the correlation of the letter G utilizing the phase-only filter of the present invention under noiseless conditions.
Figure 9:
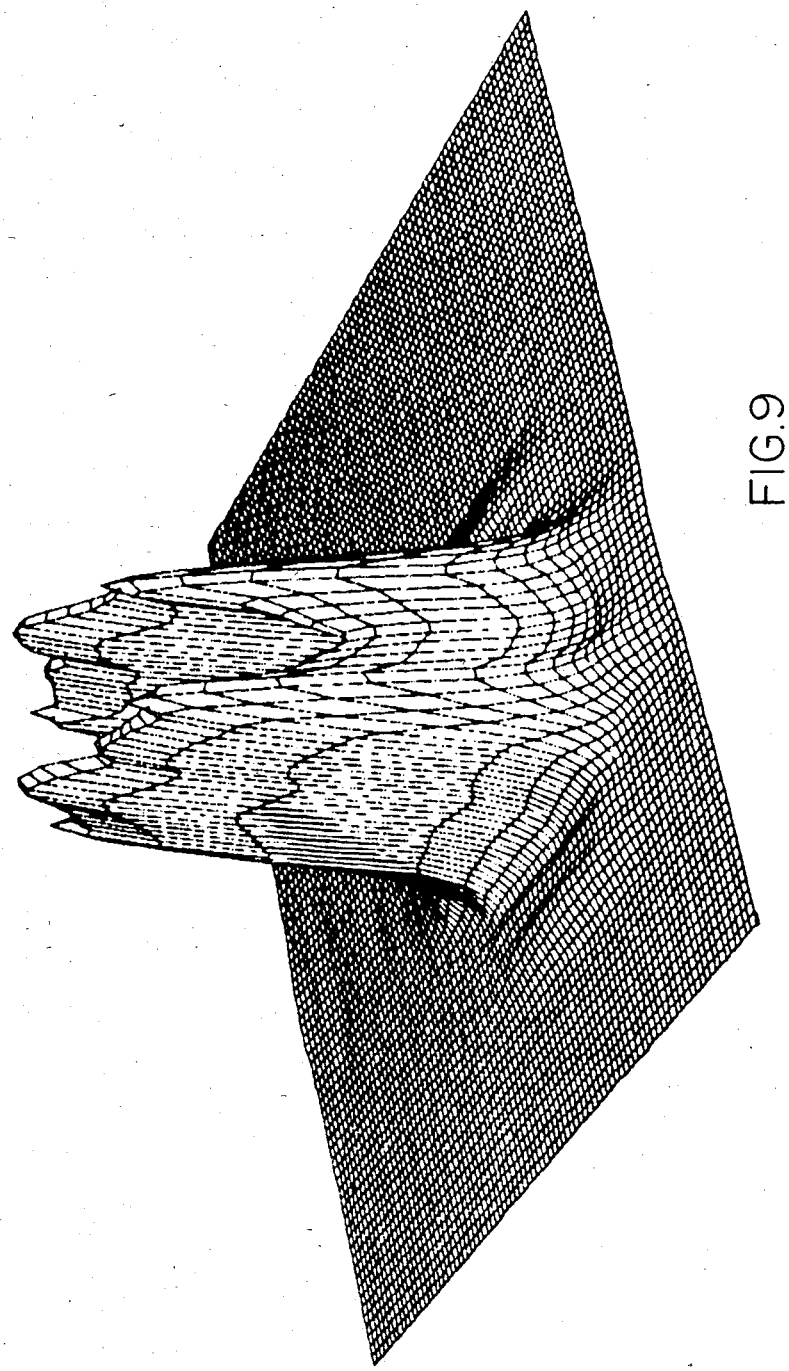
FIG. 9 is a three dimensional graphic represention of the correlation of the letter G utilizing an amplitude-only filter under noiseless conditions.

FIGS. 7 through 9 provide three dimensional graphic illustrations for noiseless input. They show the autocorrelations of the input letter G with (1) the filter G for the classical Vander Lugt matched filter (FIG. 7 of the drawings), (2) the phase-only correlation filter 22 of the present invention (FIG. 8), and (3) an amplitude-only filter (FIG. 9). Three other tests were performed giving the cross correlations in the output plane between the input letter O and the filter G with the three different types of filters set forth as items 1-3 above, however, those three dimensional graphs are not shown in the drawings since they are virtually identical to the graphic illustrations represented in FIGS. 7 through 9. The peak height of the correlation function is shown as identical in FIGS. 7-9, as a result of the 3-D plot program. However, the correlation peak values differ which enables a discrimination to be made between the letters O and G. The actual peak heights are quite different as shown below in the Table and discussed below.

The same kinds of correlation tests as described above were repeated with noise added to the original input signal, but not to the filter. This noise was Gaussian-distributed, white noise, having a zero mean and a standard deviation of $\sigma$. The signal-to-noise (S/N) ratio is related to $\sigma$ as $S/N = 1/\sigma$.

Figure 10:
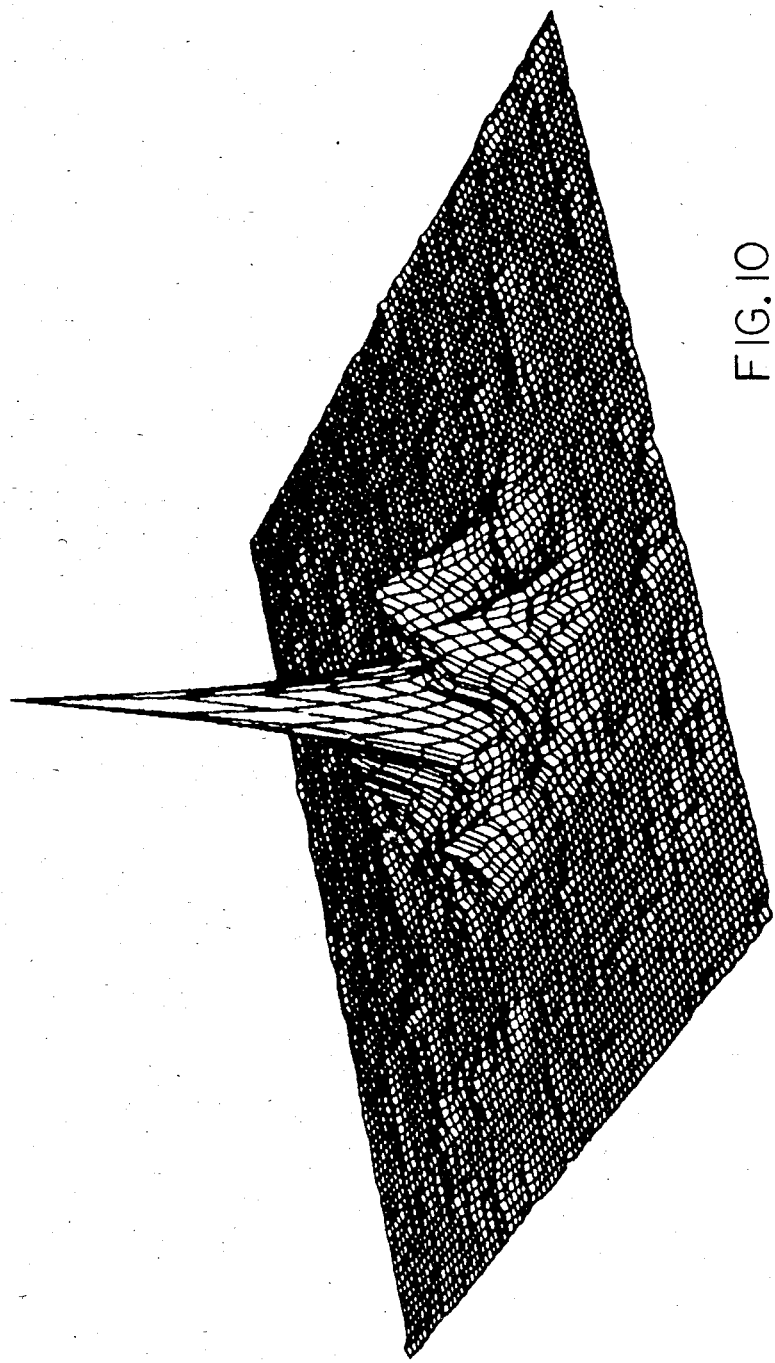
FIG. 10 is a three dimensional graphic representation of the correlation of the letter G utilizing a conventional or classical matched filter under conditions of noise.
Figure 11:
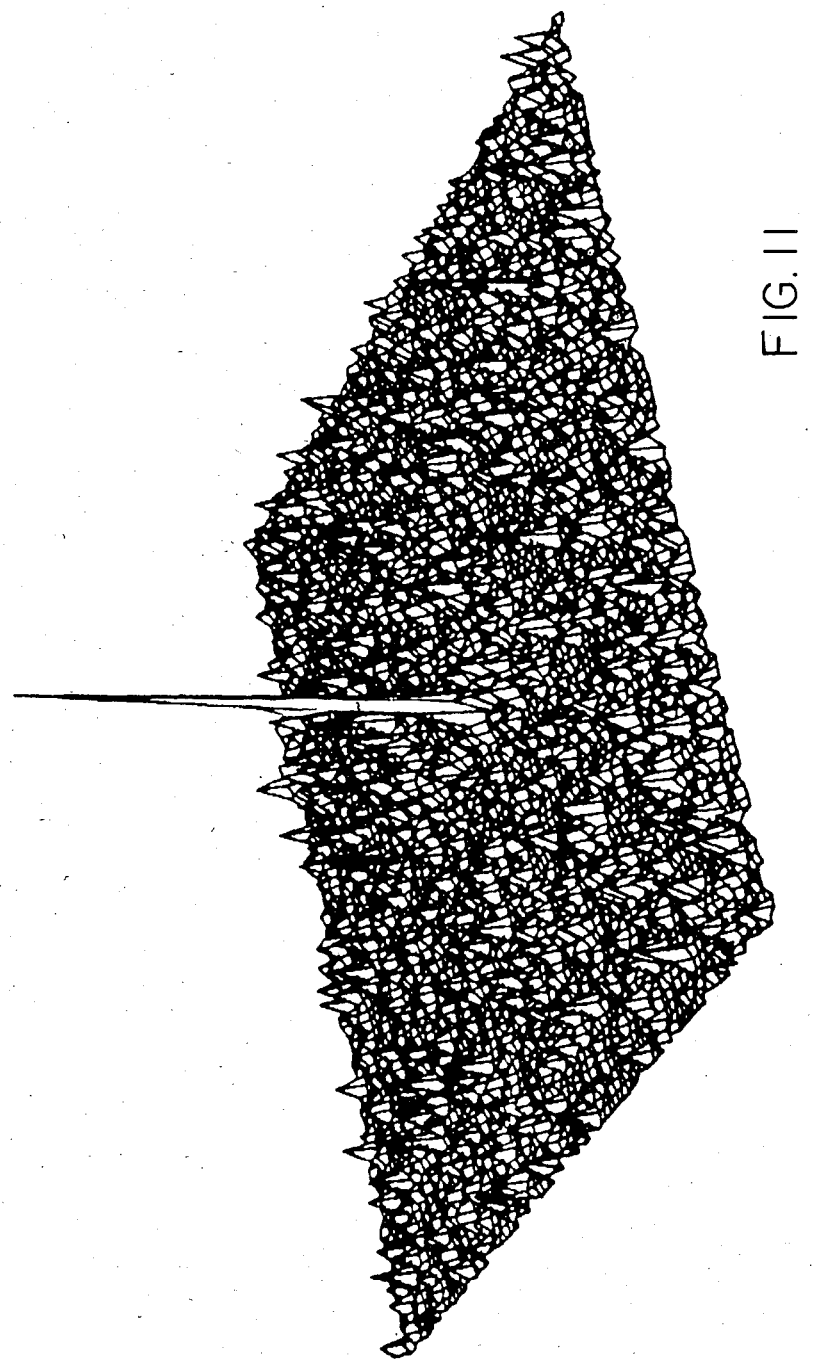
FIG. 11 is a three dimensional graphic representation of the correlation of the letter utilizing the phase-only correlation filter of this invention under conditions of noise.

The results of these autocorrelation tests for the $S/N = 1$ case are shown in FIGS. 10 and 11 of the drawings, illustrative of (1) the classical matched filter, and (2) the phase-only correlation filter of the present invention, respectively. The amplitude-only filter is not shown as its several peak values and excessively wide base render it practically useless for purposes of correlation. As before, the graphs for the cross correlation tests look quite similiar to those depicted in FIGS. 10 and 11 and therefore are not shown.

In order to better understand the superiority of the phase-only correlation filter 22 of the present invention over both the Vander Lugt matched-filter and the amplitude-only filter reference is now made to the Table set forth hereinbelow.

TABLE

|  | Correlation Function | S/N = ∞ | | | S/N = 1 | | |
|---|---|---|---|---|---|---|---|
|  |  | Peak Height | Δ | $\eta_H$ | Peak Height | Δ | $\eta_H$ |
| Matched | G*G | 1.0 |  | 27.2% | .95 |  | 1.2% |
| Filter | O*G | 0.92 | −8% | 27.2% | .89 | −8% | 1.2% |
| Phase-Only | G*G$_\phi$ | 57.6 |  | 100% | 51.8 |  | 100% |
| Filter of Invention | O*G$_\phi$ | 35.3 | −39% | 100% | 30.9 | −40% | 100% |
| Amplitude- | G*G$_A$ | 0.29 |  | 27.2% | 0.32 |  | 1.2 |
| only Filter | O*G$_A$ | 0.27 | −6% | 27.3% | 0.32 | 0 | 1.2 |
|  | 1 | 2 | 3 | 4 | 5 | 6 | 7 |

The optical efficiency or more aptly referred to as the Horner efficiency $\eta_H$ by H. J. Caufield in *Applied Optics*, Vol. 21, No. 24, December 1982, pgs 4391–4392 is set forth in column 4 of the Table. This optical or Horner efficiency $\eta_H$, is set forth by the following equation:

$$\eta_H = \eta_M \frac{\int\int |f(x,y)^*g(x,y)|^2 dxdy}{\int\int |f(x,y)|^2 dxdy}$$

where * indicates correlation, and $\eta_M$ = the diffraction of the medium used to record the function g(x,y) or G(ω) in the case of the Vander Lugt Correlator.

As is clearly evident from the Table, the phase-only correlation filter of the present invention, for a S/N = ∞ (i.e. no input noise), yields 100% efficiency, while the classical matched-filter and the amplitude-only filter have efficiencies of only approximately 27%.

Since correlation is frequently used to identify characters and since an effective optical correlation must be able to discriminate between closely similiar characters such as an O and G as shown in FIGS. 6A and 6B of the drawings, reference to column 2 of the Table illustrates that the classical matched-filter is only capable of differentiating the O from the G with an 8% change in the correlation function peak, the amplitude-only filter with 6%. However, the phase-only correlation filter of the present invention does so with a 39% change in the correlation function peak. Such statistical evidence clearly demonstrates the ability of the phase-only filter of the present invention to discriminate considerably better than the filters of the past.

The crucial test of any filter, however, is its performance under conditions of noise, or what is more commonly referred to at "robustness." Columns 5, 6, 7 of the Table show the performance of the three different types of filters set forth above in the presence of three different amounts of white, additive, zero-mean, Gaussian noise with a S/N ratio of 1. The optical efficiency of the classical matched filter drops to 1.2% while the phase-only filter of this invention stays at 100%. An analysis of the results shown in the Table substantiates the position that the discrimination ability and optical efficiency of the phase-only correlation filter of the present invention is far superior to past filters even in the presence of large amounts of noise.

Figure 12:
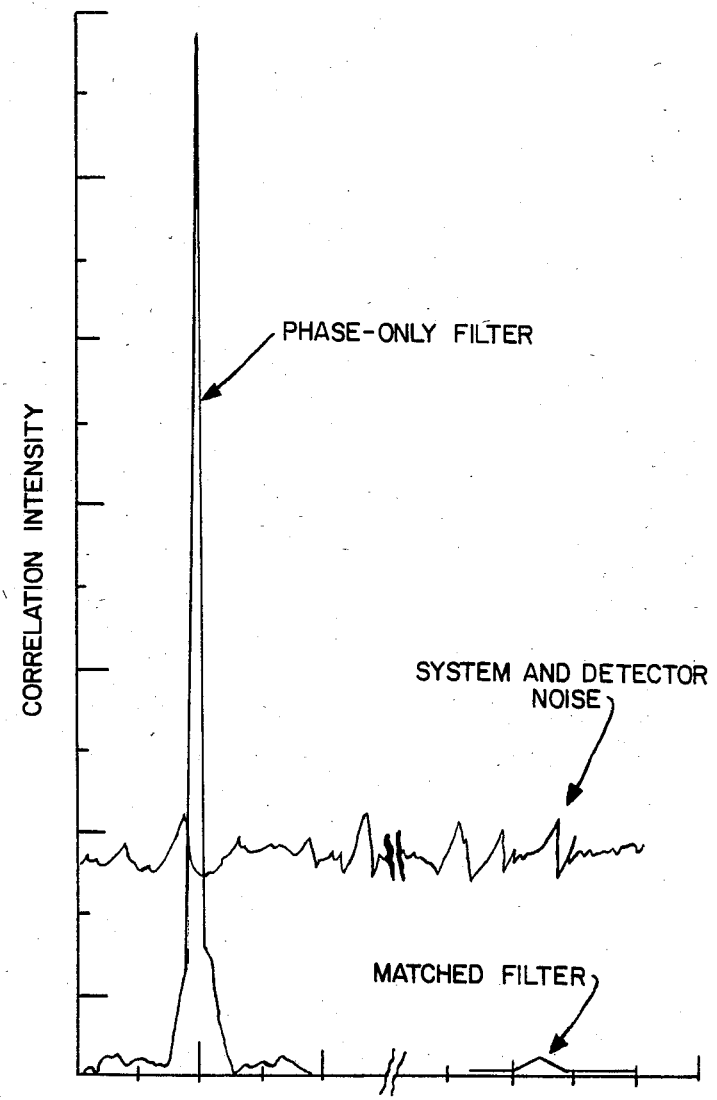
FIG. 12 is a graphic representation, for comparison purposes, of the autocorrelation outputs of the phase-only filter of this invention and the classical matched filter, respectively.

As a further comparison of the relative merits of the performance or the phase-only filter of this invention to the matched filter, the reference is now made to the graph of FIG. 12 for a plot of the auto correlation outputs for these filters in the vicinity of their peaks in the correlation plane for S/N = 1. The data for these graphs is taken from column 5 of the Table, which shows the absolute heights of the various correlation experiments. The ratio of the two peak heights is approximately 55:1.

A hypothetical system noise line is shown and a level of this system noise is attributable to the detector and the optical components of the system itself. In an optical correlation system driven by a low powered laser (which is most desirable) it would be the absolute values of the peaks relative to the total noise that would be of the utmost importance. Under these conditions, as the graph of FIG. 12 shows, the matched-filter signals would be undetectable while the phase-only filter of the present invention provides excellent results.

Although this invention has been described with reference to a particular embodiment, it will be understood that this invention is also capable of further other embodiments with the spirit scope of the appended claims.

I claim:

1. A method of producing a phase-only correlation filter comprising the steps of:
   (a) generating preselected phase-only information by a fast Fourier Transform technique;
   (b) transferring said phase-only information onto a nonexposed holographic film;
   (c) developing said film; and
   (d) bleaching said film, said bleached film capable of being used as a phase-only correlation filter having a phase pattern representative of said preselected phase-only information.

2. A method for producing a phase-only correlation filter as defined in claim 1 wherein said step of generating preselected phase-only information is performed mathematically.

3. A method for producing a phase-only correlation filter as defined by claim 2 wherein said step of transferring said phase information onto said film includes converting said mathematical phase information into an intensity modulated beam of electromagnetic radiation which is imaged onto said film.

4. A method for producing a phase-only correlation filter as defined in claim 3 wherein said step of bleaching said developed film is accomplished with a mercury chloride solution.

5. A phase-only optical correlation system comprising:
   means for providing a beam of electromagnetic radiation and directing said beam along a preselected optical axis;
   means in optical alignment with said beam for taking the Fourier Transform of a preselected first signal and forming said Fourier Transform at a first preselected position coincidental with said optical axis;
   a phase-only filter located at said first preselected position and in optical alignment with said preselected optical axis, said phase-only filter providing phase-only information of a second signal to be correlated with said first signal, and said phase-only filter being made by a technique which includes a series of photo-only filter being made by a technique which includes a series of photo-chemical procedures; and means in optical alignment with said phase-only filter for taking the inverse Fourier Transform of the product of said first signal and said phase-only information of said second signal and forming said inverse Fourier Transform at a second preselected position coincidental with said optical axis, said inverse Fourier Transform being substantially equivalent to the mathematical correlation function between said first signal and said second signal;

whereby said phase-only optical correlation system provides substantially 100% utilization of said electromagnetic beam of radiation.

6. A phase-only optical correlation system as defined in claim 5 wherein said means for providing said beam of electromagnetic radiation is a low power laser.

7. A phase-only optical correlation system as defined in claim 6 wherein said photo-chemical technique of producing said phase-only filter includes generating preselected phase-only information by a fast Fourier Transform technique, transferring said phase-only information onto a nonexposed holographic film, developing said film, and bleaching said film.

8. A phase-only optical correlation system as defined in claim 7 wherein said generating of preselected phase-only information is performed mathematically.

9. A phase-only optical correlation system as defined in claim 8 wherein said transferring said phase-only information onto said film includes converting said mathematical phase information into an intensity modulated beam of electromagnetic radiation which is imaged onto said film.

10. A phase-only optical correlation system as defined in claim 9 wherein said power of said low power laser is approximately 10 mW.

* * * * *